United States Patent Office 3,054,904
Patented Sept. 18, 1962

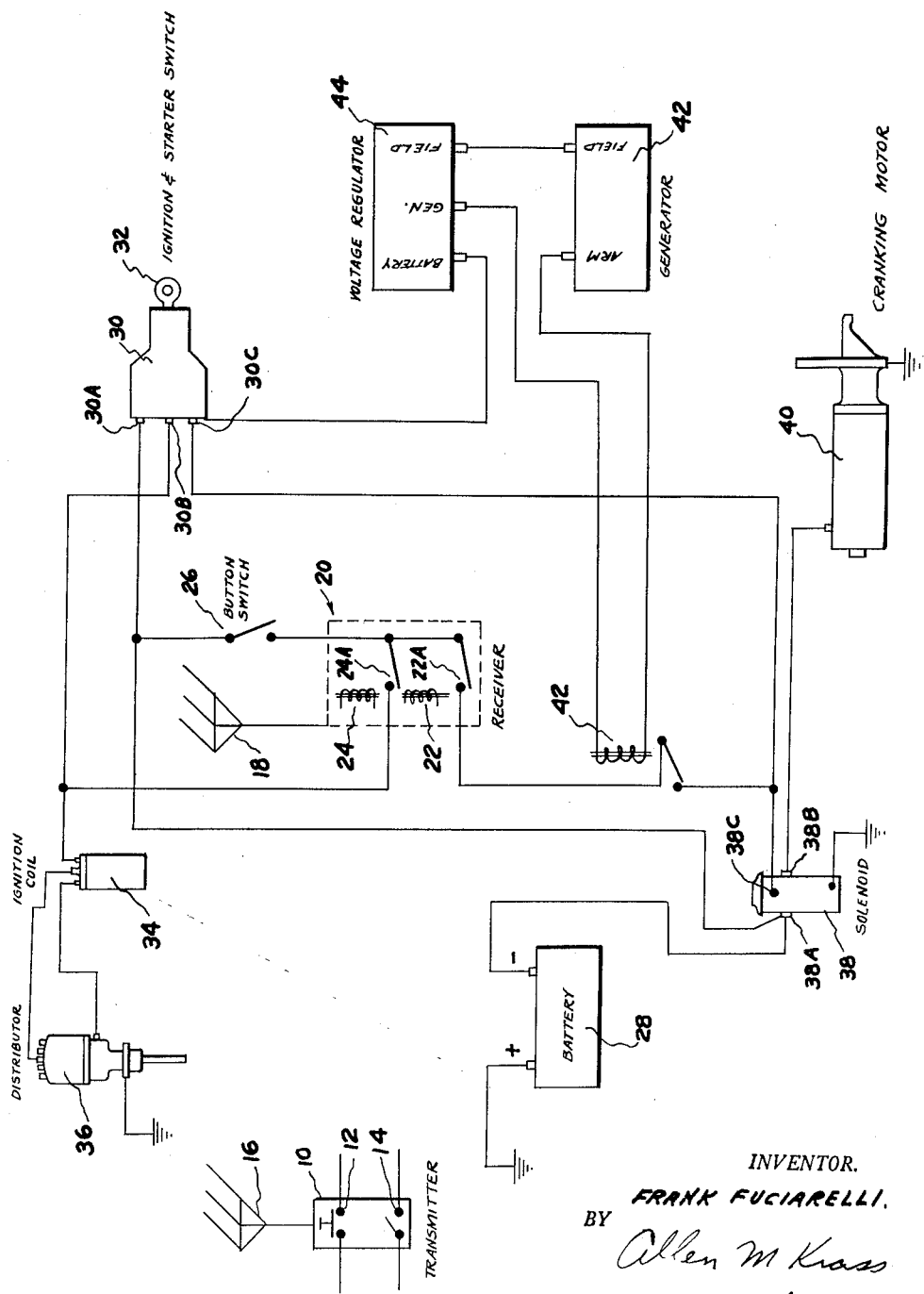

3,054,904
REMOTE CONTROL AUTOMOTIVE STARTING SYSTEM
Frank Fuciarelli, Garden City, Mich.
(3028 N. 47th St., Phoenix 18, Ariz.)
Filed Feb. 20, 1961, Ser. No. 90,335
1 Claim. (Cl. 290—37)

This invention relates to a system for starting the engine of a self-propelled vehicle such as an automobile from a remote location.

The desirability of allowing an automobile engine to run for a short period of time such as a few minutes before the vehicle is used is well recognized. In addition to permitting the engine to obtain an efficient running temperature in cold weather, it allows heaters which depend on the engine's fluid cooling system as a heat source to attain a proper mode of operation. To eliminate the necessity of a driver sitting in the vehicle while it is undergoing this warm-up period, it has previously been proposed to provide a system capable of automatically starting the engine at a predetermined time without operator attention. Such systems have proposed to employ a timing device which operates to close a switch at a pre-selected time thereby initiating an electrical cycle capable of starting the engine. These time actuated systems introduce a degree of rigidity in the planning of the operator in that they must be pre-set to operate some time in advance of their intended use and will operate at that time independent of a change in plans of the operator unless properly deactuated. They also create the requirement for elaborate systems for turning off the engine cranking mechanism in the event that the engine is not started within either a predetermined time of its actuation or upon the occurrence of some physical condition in the engine.

The present invention overcomes these disadvantages of time-actuated starting systems while providing all their advantages through the use of an engine starting system which may be actuated into an operating mode by the operator at will from a distance. Thus the operator may start the engine at any time that he is present within a prescribed distance from the automobile and may pace the engine starting cycle through its various modes at a rate that is adapted to initiate the starting of his own vehicle.

In order to accomplish these objectives, the present invention provides a radio receiver at the automobile which is capable of providing three switching modes to the automobile electrical system under the control of signals emanating from a radio transmitter controlled by the operator. The three switching modes are "off," "ignition on, starter motor on," and "ignition on, starter motor off." This allows the operator to turn on the automobile's ignition system and simultaneously energize the starter motor and to de-energize the starter motor when he deems it proper to do so. The determination of the proper time to deactuate the starter motor may be made on the basis of a visual observation of the exhaust of the car from a distance or after the operator believes that a sufficient time has elapsed for the automobile to become started based upon his knowledge of the automobile's starting characteristics. The invention also contemplates a control system in the car for deactuating the starting motor in the event that the engine starts while the radio control is still in a "starter motor on" mode.

By thus providing parallel methods of automatically or remotely deactivating the starter system, the system provides the operator with a high degree of flexibility and allows him to exercise his judgment as to the manner of actuating the engine.

The present invention contemplates that the radio transmitter and receiver employed with the remote control may be any of several well-known types. The three modes of operation may be accomplished with a single transmitter and receiver in any of three ways: (1) Use of a transmitter and receiver which are operative on either or both of two channels. When the transmitter is not operative on either channel, the receiver will be in the first switching mode; when the transmitter is operative on a single channel, the receiver will be in the second switching mode; and when the transmitter is operative on both channels, the receiver will be in the third switching mode. (2) Use of a single carrier modulated by one or more tones. (3) Use of a single channel pulse receiver and a ratchet-type stepping relay in the receiver which operates the control successively through the three switching modes upon the receipt of a series of pulses from the transmitter. In addition to providing the receiver and switching action, the control system within the automobile must insure that the automobile is in a proper mode for starting previous to the actuation of the starter motor and must provide means for deactuating the starter motor in the event the engine starts running while still in the starting mode. The invention contemplates such control means which are essentially simple and easily applicable to a wide variety of internal combustion engines.

Other objects, advantages, and applications of the present invention will be made apparent by the following detailed description of the preferred embodiment of the invention. The description makes reference to the single accompanying drawing which represents a schematic diagram of both ends of the control system as applied to a conventional automobile electrical system.

As has been noted, any of several well-known transmitter receiver radio links might be utilized. The one utilized in the preferred embodiment employs a transmitter capable of emitting a wave in either or both of two frequencies. In the drawing, transmitter 10 is illustrated as having two switches (1) a momenttary contact switch 12 which controls the first channel, and (2) a regular on-off switch 14 which controls the second channel.

The antenna 16 of the transmitter emits radio waves which are received by an antenna 18 of a receiver, generally indicated at 20. The receiver is shown as schematically including two relays 22 and 24. Each relay is associated with a single pole, single throw, normally open, switch, 22A and 24A. The relay 22 is connected through the receiver as to be closed when a signal is transmitted over the channel controlled by the momentary contact switch 12 of the transmitter 10 while relay 24 is adapted to be actuated when the signal is transmitted with the on-off switch 14 of the receiver 10.

One of the terminals of each of the switches 22A and 24A are connected in common to one terminal of a single pole, single throw, button switch 26. The button switch 26 has as its function to indicate that the automobile is in condition for automatic starting. It preferably comprises a switch in the car thrown by the operator as he leaves the car with the intent of later starting the engine from a remote position. It might also incorporate a transmission switch which should only be closed with the transmission when in a neutral or parked position. The button switch 26 also has a set of contacts (not shown) which connect the receiver to the battery of the vehicle.

The other terminal of the switch 26 is connected to the negative terminal of the electrical system battery 28. The positive terminal of the battery is grounded within the system.

The negative terminal of the battery also connects to terminal 30A on a key-type ignition and starter switch 30. The switch 30 also has terminals 30B and 30C. The switch is of the ordinary automotive type actuated by a key 32 and has an "off" position, a "start" position, in which both the ignition system and the starter system are actuated, and a "run" position, in which the ignition system alone is actuated. These three positions are analogous to the three modes of operation which may be actuated by the operator of the remote control system through use of the switches 12 and 14.

The terminal 30B of the key switch 30 connects to one terminal of the ignition coil 34 which is, in turn, connected to the distributor 36. The other end of the distributor is grounded. Therefore, the ignition system is actuated when the internal mechanism of the switch 30 connects the terminals 30A and 30B. The terminal of the ignition coil that connects to terminal 30A of the key switch also connects to one side of the switch 24A of the receiver. Thus when the switches 24A and 26 are closed, as in the case when the automobile is in the remote control mode, and the relay 24 of the receiver is actuated by a pulse received from the transmitter through closure of the switch 14, the function of the ignition and starter switch in energizing the ignition system is bypassed.

The negative terminal of battery 28 additionally is connected to one terminal 38A of a grounded starter motor solenoid 38. The function of the solenoid is to connect its terminals 38A and 38B when a signal is received on its third terminal 38C. The terminal 38B is connected to the cranking motor 40 which has its other side grounded. Therefore, when the terminals 38A and 38B are connected together upon receipt of a signal on terminal 38C, the cranking motor is energized. The terminal 38C is connected to the third terminal 30C of the key switch 30. When the key 32 actuates the switch 30 to the start mode, the switch connects the terminals 30A and 30C sending a signal to the terminal 38C of the solenoid and actuating the cranking motor. Terminal 38C is also connected to the free terminal of the switch 22A on the receiver through the normally closed contacts of a relay 42; thus when relay 42 is not actuated and the switch 22A is closed as the result of the receiver 20 picking up a signal from the transmitter 16 which occurs when the momentary switch 10 is closed, the function of the key switch 30 in actuating the starting motor is bypassed.

The relay 42 is electrically disposed between the generator 43 and a voltage regulator 44. The relay 42 is thus energized when the generator is sending current to the voltage regulator. This only occurs when the engine has started. In this manner the relay 42 acts as a cut-out relay to disconnect the circuit from the starter solenoid to the negative terminal of the battery when the engine starts and thereby disconnect the cranking motor 40.

In operation, when the driver leaves the vehicle and anticipates the possibility of his having to start it automatically, he places the transmission in neutral or park position and actuates the switch 26. This switch 26 also incorporates means for energizing the receiver. Although the receiver's internal construction and connections are not shown, it is preferably of a transistor type so as to provide a low drain on the battery to which it is connected.

The operator may then at any time start the engine by first energizing the transmitter and closing the switch 14. This puts out a signal on one channel which energizes the relay 24 on the receiver and closes the switch 24A. Since the button switch 26 is closed, this establishes a path between a negative terminal battery and the ignition circuit. The operator then presses the button 12 energizing the other channel in the transmitter and actuating relay 22 in the receiver. This closes the switch 22A which connects the negative terminal of the battery to the solenoid 38 and thereby energizing the cranking motor.

The operator may from his position visually observe the exhaust of the automobile to determine when it is started or he may maintain the push button 12 closed for a period of time which his knowledge of the automobile leads him to believe is sufficient to start the engine. If the engine starts prior to the time he releases the button 12, the cut-out relay 42 will disconnect the solenoid of the starter motor from the negative terminal battery. At such time as the operator desires to turn off the engine by remote control, he may open the switch 14 of his transmitter.

The connections of the receiver 20 to the electrical circuitry of the automobile are such as to avoid disturbing normal operation of the key switch 30.

Having thus described my inveniton, I claim:

A remote control starting system for an engine of an automotive vehicle having an electrical system including an ignition system, a starting motor system, a battery, and a key switch operative to connect either said ignition system or said ignition system and electrical system to said battery, comprising: a radio receiver having two normally open output switches, the first of said output switches being connected across said key switch in such a manner as to connect said ignition system to said battery at such time as it is closed, and said second output switch being connected across said key switch in such a manner as to connect the starting motor circuit to the battery at such times as it is closed; first switch means disabling said receiver when the automobile is not in condition to be started; and a relay operative to disconnect said second output switch means at such time as the engine is running.

References Cited in the file of this patent
UNITED STATES PATENTS

| | | |
|---|---|---|
| 2,056,699 | Warner | Oct. 6, 1936 |
| 2,367,960 | Parfitt | Jan. 23, 1945 |
| 2,817,025 | Adler | Dec. 17, 1957 |
| 2,873,382 | Herring | Feb. 10, 1959 |
| 2,992,412 | Spindler | July 11, 1961 |